(12) United States Patent
Davies et al.

(10) Patent No.: US 6,488,228 B2
(45) Date of Patent: Dec. 3, 2002

(54) TAPE FOR FLYING SPLICE, METHOD OF USE, AND METHOD OF MANUFACTURE

(75) Inventors: Michael P. Davies, Wales (GB); Ronald Allan Hayes, Pinner (GB); Charles Jonathan Loring, Cardiff (GB); Alan Thomas Mann, Cardiff (GB)

(73) Assignee: 3M Innovative Properties Company, St. Paul, MN (US)

( * ) Notice: Subject to any disclaimer, the term of this patent is extended or adjusted under 35 U.S.C. 154(b) by 36 days.

(21) Appl. No.: 09/770,985

(22) Filed: Jan. 26, 2001

(65) Prior Publication Data

US 2002/0056784 A1 May 16, 2002

Related U.S. Application Data

(63) Continuation-in-part of application No. 09/668,333, filed on Sep. 22, 2000, now abandoned.

(51) Int. Cl.[7] .............................................. B65H 19/18
(52) U.S. Cl. ................................... 242/556.1; 156/504
(58) Field of Search ............................ 242/556, 556.1; 156/502, 504, 507

(56) References Cited

U.S. PATENT DOCUMENTS

| 3,503,568 A | 3/1970 | Galley |
| 4,388,432 A | 6/1983 | Eskay |
| 4,398,985 A | 8/1983 | Eagon |
| 4,413,080 A | 11/1983 | Blake |
| 4,482,675 A | 11/1984 | Witt |
| 4,569,960 A | 2/1986 | Blake |
| 4,905,924 A | 3/1990 | Moore |
| 5,102,733 A | 4/1992 | Zawadzki |
| 5,125,995 A | 6/1992 | D'Haese et al. |
| 5,212,002 A | * 5/1993 | Madrzak et al. ......... 242/556.1 |
| 5,275,344 A | * 1/1994 | Ray .............................. 156/504 |
| 5,323,981 A | * 6/1994 | Dionne ........................ 156/502 |
| 5,348,793 A | 9/1994 | Stettner |
| 5,380,779 A | 1/1995 | D'Haese |
| 5,692,699 A | 12/1997 | Weirauch et al. |
| 5,901,919 A | 5/1999 | Wienberg |
| 5,916,651 A | 6/1999 | Wienberg et al. |
| 5,996,927 A | 12/1999 | Weirauch |

FOREIGN PATENT DOCUMENTS

| CA | 2212201 | 8/1996 |
| DE | 92 01 286.8 | 6/1992 |
| DE | 92 15 731.9 | 4/1993 |
| DE | 196 32 689 | 2/1998 |

(List continued on next page.)

Primary Examiner—William A. Rivera

(57) ABSTRACT

A splicing tape for splicing a leading edge portion of the outer turn of a roll of sheet material to a second sheet material. A typical application is to join the outer turn of a replacement roll of paper to the end of depleted roll of paper while the paper remains in motion through some handling apparatus. The splicing tape comprises a first tape component, and second tape component, and a layer of adhesive separably joining the first and second tape components. The first tape component includes a first backing, a first layer of adhesive on a first surface of the first backing, and a first barrier layer on a second surface of the first backing. The second tape component includes a second backing, a second layer of adhesive on a first surface of the second backing, and a second barrier layer on a second surface of the second backing. Alternatively, the splicing tape may include only one barrier layer between the joining adhesive layer and one of the first and second backings. The layer of adhesive separably joins the first and second tape components at their respective barrier layers. Also disclosed are methods of manufacture and methods of use of the inventive splicing tape.

41 Claims, 5 Drawing Sheets

FOREIGN PATENT DOCUMENTS

| | | |
|---|---|---|
| DE | 19841609 A1 | 3/2000 |
| EP | 0 941 954 | 3/1998 |
| EP | 0 970 904 A1 | 6/1999 |
| EP | 0 970 905 A1 | 6/1999 |
| GB | 1220882 | 1/1971 |
| GB | 2294235 | 4/1996 |
| JP | 10-88088 | 8/1997 |
| WO | WO 95/29115 | 11/1985 |
| WO | WO 91/08159 | 6/1991 |

* cited by examiner

TAPE FOR FLYING SPLICE, METHOD OF USE, AND METHOD OF MANUFACTURE

RELATED APPLICATION

This application is a continuation-in-part of U.S. patent application Ser. No. 09/668,333, filed on Sep. 22, 2000 now abandoned.

TECHNICAL FIELD

The present invention relates to splicing tapes suitable for splicing a leading edge portion of the outer turn of a roll of sheet material to another sheet material, and methods of making and using such splicing tapes.

BACKGROUND OF THE INVENTION

Splicing tapes can be used for preparing a joint between two sheet materials such as, for example, between the leading edge portion of the outer turn of a roll of sheet material and another sheet material. The splicing operation can be performed in a static or a dynamic mode.

In the static mode, the first and second sheet material first may be positioned in the desired configuration relative to each other, and one or more splicing tapes are then applied to join the two sheets together. It is also possible to apply the splicing tape or tapes to one of the sheet materials first. Then the second sheet material is provided, positioned in the desired configuration and the two sheet materials are joined. Splices which are obtained in a static mode of preparation are often referred to as permanent splices. Some typical configurations of static splices are butt splices, overlap splices and staggered overlap splices. These configurations are shown and discussed in FIGS. 1A–1C of WO 95/29115.

It is often desirable, however, to prepare splices in a dynamic mode. This allows, for example, in the printing industry, joining the leading edge of the new roll of paper sheet material to the trailing edge of the old, depleting roll of paper sheet material without requiring interruption of the continuous production process. Splices which are obtained in a dynamic mode of operation are usually referred to as flying splices. A conventional way of making a flying splice tape uses destructible nose tabs as is described in WO 95/29115. In a first step the new roll is appropriately prepared or "dressed" for splicing, as is shown in FIG. 1a herein, which was taken from FIG. 3A of WO 95/29115. The leading edge 35 is formed by applying a double-sided adhesive tape in the form of a W or V or in another appropriate shape to the outermost turn 32 of the new roll of sheet material 30. The outermost lap 32 is then torn back against the tape to form the leading edge portion 35 which is releasably adhered to the next-to-the-outer turn 31 by the nose tabs 23. The new roll of sheet material 30 is then accelerated to the same speed as the running web sheet of the previous, depleting roll. The running web sheet is then pressed against the new roll 30 and pasted to the double-sided adhesive tape 25 on the outermost turn 32 of the new roll 30. The previous roll is typically cut off from the running web sheet. The nose tab is then subjected to the tractive force exerted by the running web sheet. The nose tab breaks thereby releasing the temporary joint between the outer turn 32 and the next-to-the-outer turn 31 of the new roll of sheet material 30. Another known configuration for applying a flying splice is shown in FIG. 1b herein which is adapted from FIG. 3B of WO 95/29115. Other splicing tapes useful for flying splices and static splices are discussed in U.S. Pat. Nos. 5,692,699 and 5,996,927.

Another useful splicing tape useful in preparing a flying splice is shown in EP 0 941 954. The '954 reference discloses a splicing tape which uses a non-tacky polymer layer in contact with a carrier layer. The materials are chosen so as to control the separation force between the non-tacky polymer layer and the carrier layer. An optional adhesion controlling layer may be applied between the non-tacky polymer layer and the carrier layer.

Another known type of splicing tape includes a central paper layer or tissue layer which splits in use. For example, U.S. Pat. No. 5,901,919 shows an adhesive tape for flying reel change in paper finishing machines or the like, having a paper backing and a water-soluble self-adhesive composition, characterized in that the paper backing is coated on one side with a water-soluble self-adhesive composition while part of the reverse side of the paper backing is provided with a double-sided adhesive tape, which in turn has a readily splittable splicing paper backing which is provided on both sides with water-soluble self-adhesive composition.

When it is almost time to splice the new roll to the depleting roll, it is desirable to bring the new roll up to a rotational speed equal to the speed of the web from the depleting roll. Typically, this may be done by either driving the core on which the new roll is mounted, or by contacting a drive belt against the outer periphery of the new roll. When using a drive belt, it contacts against some portion of the width of the new roll, as illustrated at B in FIG. 1c. This typically occurs after the adhesive on the splicing tape has been exposed for bonding to the depleting web. It is undesirable for the drive belt to contact a significant portion of the exposed adhesive 21, as there is a chance that the splice tape could bond to the drive belt with sufficient strength to separate the splicing tape which could cause the new roll to rip or begin to unwind. One known method for minimizing this is to place bridge 29 over a portion of the exposed adhesive 21 of the splice tape for a width sufficient to protect the splice tape in the area B in which the drive belt could contact it. The bridge 29 may be a piece of adhesive tape, in which case it is applied adhesive face down, leaving the backing of the bridge tape exposed to contact the drive belt. The bridge may be a piece of paper or other material that may be conveniently adhered to the exposed adhesive 21, in which case the bridge 29 need not have any adhesive of its own. The bridge 29 may include holes that allow some of the adhesive 21 to remain exposed to strengthen the splice in the area of the bridge. It is also known to leave a small portion of the adhesive 21 exposed by placing the bridge a short distance back from the front of the adhesive 21. U.S. Pat. No. 4,905,924 discloses an alternative arrangement, in which portions of release liner extend along the length of the splicing tape, that is across the full width of the roll of material. The portions are separated from one another leaving lengths of splicing adhesive exposed.

A nose tab which is suitable for preparing a flying splice is described in GB 2,294,235. The '235 reference discloses a nose tab for temporarily interconnecting the leading and trailing ends of the outermost turn of a could of sheet material. The nose tab has a first layer to be in use adhesively attached to the under surface of the leading end. The nose tab is characterized in that it has a second layer to be in use adhesively attached to the trailing end and/or to the leading end of the next to outermost turn. The first and second layers are bonded to one another across their mutually abutting faces in a manner permitting them to be peelingly separable in use. Double sided adhesive tape may adhere the trailing inner end of the old coil and leading outer end of the new coil.

Both permanent and flying splices should provide a flexible, strong connection between the two sheet materials or webs and should maintain substantially all of the properties of the sheet material; for example, if the sheet material is paper which can be printed or coated, the splice is preferably thin, flexible, printable, coatable and also repulpable. When using configurations like those of FIGS. 1a and 1b for preparing a flying splice, it is important that air cannot enter beneath the leading edge 35 of the outer turn 32 which would result in the roll unwinding itself at very high speeds thus interrupting the continuous production. To prevent air entering beneath the leading edge 35 of the outer turn 32, small destructible adhesive tabs 27 are sometimes applied not only at the noses of the leading edge 35 but, for example, also along the diagonal edges of the leading edge 35 in FIG. 1a or over the lateral edges of the leading portion of the outer turn 32 to the sides of the roll 30. Configurations like those of FIG. 1a and 1b are time consuming to apply and require the application of double-sided adhesive tapes and destructible nose tabs.

Other fields outside splicing tapes also provide internally delaminating articles. For example, U.S. Pat. No. 4,398,985 discloses a laminated construction having differential release characteristics which will yield a self-detackifying adhesive surface upon delamination. The laminate is produced by coating a film of a polymeric material onto one side of a face stock material and then laminating this construction to an adhesive which has been coated onto a release liner. The release liner is removed and the remaining portion of the laminate is affixed to a suitable substrate utilizing the exposed adhesive surface. The polymeric material is chosen so that upon delamination of the face stock from the substrate, it remains affixed to the adhesive coating. This results in a self-detackified adhesive surface on the substrate. The abstract of the '985 reference states that such laminate constructions are useful for tags, labels, stickers, and the like as well as for sending credit, business, or membership cards on preprinted mailers to ultimate users. Because of the unique self-detackifying surface produced, both the face stock and substrate can be used and further handled or processed by hand or automated equipment.

Although the commercial success of available splicing tapes has been impressive, it is desirable to further improve the performance of splicing tapes.

SUMMARY OF THE INVENTION

One aspect of the present invention provides a splicing tape for splicing a leading edge portion of the outer turn of a roll of sheet material to a second sheet material. The splicing tape comprises a first tape component, a second tape component, and a third layer of adhesive separably joining the tape components. The first tape component includes a first backing, a first layer of adhesive on a first surface of the first backing, and a first barrier layer on a second surface of the first backing. The second tape component includes a second backing, a second layer of adhesive on a first surface of the second backing, and a second barrier layer on a second surface of the second backing. The third layer of adhesive separably joins the first barrier layer and the second barrier layer together.

In one preferred embodiment of the above splicing tape, the first and second backings comprise repulpable backings. More preferably, the first and second backings comprise cellulosic backings. Most preferably, the first and second backings comprise paper backings.

In another preferred embodiment of the above splicing tape, the first and second barrier layers prevent significant penetration of the third adhesive layer into the first and second backings. Preferably, at least one of the barrier layers comprises a lacquer.

In another preferred embodiment, at least one of the barrier layers comprises a filled barrier layer to control the bond strength between the filled barrier layer and the third adhesive layer. Preferably, the filled barrier layer comprises a silicone filled barrier layer. In another preferred embodiment, the barrier layer comprises a UV curable barrier layer.

In another preferred embodiment of the above splicing tape, the third layer of adhesive comprises a water-based adhesive. In another preferred embodiment, the third layer of adhesive comprises a synthetic resin emulsion based adhesive.

In another preferred embodiment of the above splicing tape, the third layer of adhesive comprises a gradient in the direction along the width of the tape.

In one embodiment, the above splicing tape, when in use, separates by cohesive separation of the third adhesive layer. In another embodiment, the splicing tape separates by delamination between the third adhesive layer and either of the first and second barrier layers.

In another embodiment, the splicing tape also includes a release liner on at least one of the first and second adhesive layers. Preferably, the release liner comprises a first portion and a second portion, each being independently separable from the splicing tape.

In another embodiment, the release liner comprises a first portion, a second portion, and a third portion. The first portion extends along the length of the splicing tape adjacent a first edge of the splicing tape, the third portion extends along the length of the splicing tape adjacent a second edge of the splicing tape, and the second portion extends along the length of the splicing tape between the first and third portions. The second portion of the release liner includes a plurality of weakened lines extending across the width of the second portion.

In any of the above embodiments, the splicing tape may include only a single barrier layer rather than first and second barrier layers. The splicing tape may include the barrier layer between the third adhesive layer and either of the first and second backings. In this embodiment, the splicing tape, when in use, preferably separates between the third adhesive layer and the barrier layer.

Another aspect of the present invention provides a method of making a splicing tape for splicing a leading edge portion of the outer turn of a roll of sheet material to a second sheet material. The method comprises the steps of: a) providing a first tape portion including a first backing and a first layer of adhesive; b) applying a first barrier layer on the first backing opposite the first layer of adhesive; c) providing a second tape portion including a second backing and a second layer of adhesive; d) applying a second barrier layer on the second backing opposite the first layer of adhesive; e) applying a third adhesive layer to either of the first and second barrier layers; and f) laminating the first and second tape portions together with the third layer of adhesive between the first and second barrier layers. In one preferred embodiment of this method, steps b) and d) each further comprise curing the barrier layer with UV light. In another preferred embodiment, steps b) and d) are performed concurrently.

Another aspect of the present invention provides a method of preparing a roll of web material for a flying splice. The method comprising the steps of: a) adhering a separable splicing tape to a roll of web material, wherein the splicing tape includes a release liner facing away from the roll and a layer of adhesive covered by the release liner; b) removing a first portion of the release liner along the length of the splicing tape to expose a first portion of the layer of adhesive, while maintaining a second portion of the adhesive tape along the length of the splicing tape covered with a second portion of the release liner; c) adhering the leading edge portion of the roll of web material to the first portion of the adhesive; and d) removing a first lengthwise segment of the second portion of the release liner while maintaining a second lengthwise segment, to thereby expose a first lengthwise segment of the second portion of the adhesive layer and to thereby maintain covered a second lengthwise segment of the second portion of the adhesive layer.

In one preferred embodiment of this method, it further includes the step of removing a third portion of the release liner along the length of the splicing tape, with the second portion between the first and third portions.

In another preferred embodiment of this method, step d) includes separating the second portion of the release liner along a weakened line.

In another preferred embodiment of this method, step d) includes removing a first and second segment of the second portion of the release liner from opposite sides of the second segment.

Certain terms are used in the description and the claims that, while for the most part are well known, may require some explanation. The term "delamination" as used herein refers to an adhesive separation mode of the splicing tape 10 whereby the splicing tape 10 separates between two adjacent layers so as to leave exposed the surfaces of the adjacent layers which had been in contact with each other previously. The term "splitting" as used herein refers to a cohesive separation mode of the splicing tape 10 whereby the splicing tape 10 breaks through one of its layers so as to leave exposed two inner surfaces of such layer.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 2:
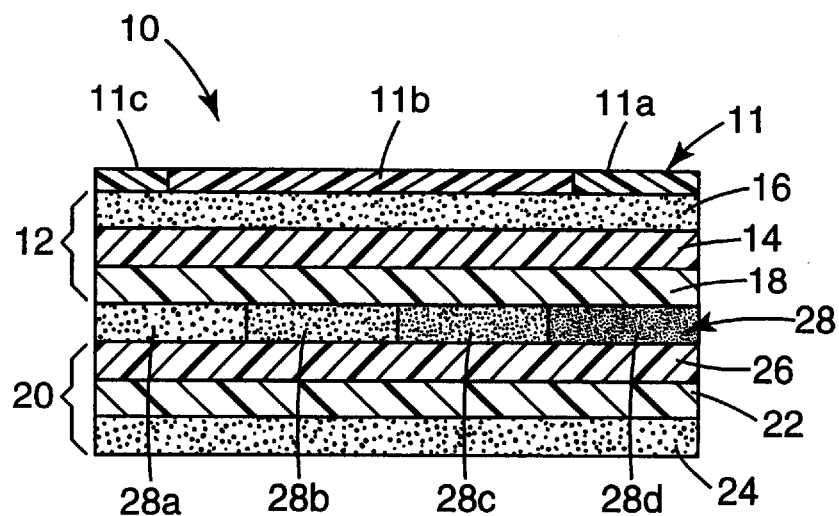
FIG. 2 is a cross sectional view of a preferred embodiment of a splicing tape according to the present invention.

FIG. 2 is a cross-sectional view of a preferred embodiment of a splicing tape 10 according to the present invention. Splicing tape 10 generally includes a first tape component 12 and a second tape component 20. The first and second tape components 12, 20 are separably joined by a third adhesive layer 28. The splicing tape can optionally include release liner 11. In its basic operation, the splicing tape 10 initially holds the outer wind of a new roll of material to the next to last wrap to prepare the new roll for forming a flying splice with the trailing portion of a depleting roll of web material. The second tape component 20 will be adhered to the outer surface of the next to last wrap of the new roll of material, while a portion of the first tape component 12 will be adhered to the underside of the outermost wrap of material at its leading edge. Another portion of the first tape component 10 will be exposed for adhering to the trailing portion of the depleting roll of material. As the trailing portion continues its travel and pulls on the first tape component 12, the first and second portions 12, 20 will separate at the third adhesive layer 28. This splicing tape 10 and its method of use will now be described in greater detail.

Splicing tape 10 includes first tape component 12. The first tape component includes a first backing 14. The first tape component 12 also includes a first adhesive layer 16 on a first surface of the first backing 14. In the illustrated embodiment, first tape component 12 also includes a first barrier layer 18 on a second surface of the first backing opposite the first adhesive layer 16. This optional first barrier layer is preferred in some applications, but may be omitted as discussed below.

Splicing tape 10 also includes a second tape component 20. The second tape component 20 may be of similar or identical construction to the first tape component 12. The second tape component 20 includes a second backing 22. The second tape component 20 also includes a second adhesive layer 24 on a first surface of the second backing 22. Second tape component 20 also includes a second barrier layer 26 on a second surface of the second backing opposite the second adhesive layer 24.

The first and second tape components 12, 20 are separably joined by a third adhesive layer 28. The first and second tape components are joined by their respective barrier layers 18, 26 to the third adhesive layer 28. In this manner, the first adhesive layer 16 of the first tape component faces outwardly for attachment to the underside of the outermost wrap of the new material at its leading edge and also to the trailing portion of a depleting roll of material. This arrangement also provides the second adhesive layer 24 of the second tape component facing outwardly for attachment to the second to last wrap of the new roll of web material.

The first and second portions 12, 20 of the splicing tape are separably joined by the third adhesive layer 28. This allows the splicing tape to separate when the outermost wrap on the new roll attaches to the trailing portion of the depleting web. Generally, the first tape component 12 will form the splice between the two webs of material after separation. The second tape component 20 will remain where it was adhered to the second to outermost wrap of the new material. The splicing tape may separate by any one or a combination of the following means. The third adhesive layer 28 may cohesively separate such that a portion of the third adhesive layer 28 will remain on the first tape component 12 and a portion will remain on the second tape component 20. The splicing tape may delaminate between the first barrier layer 18 on first tape component 12 and the third adhesive layer 28 such that the third adhesive layer remains on the second barrier layer 26 of the second tape component 20. The splicing tape may delaminate between the second barrier layer 26 of the second tape component and the third adhesive layer 28 such that the third adhesive layer 28 remains on the first barrier layer 18 of the first tape component 12.

Preferably, the adhesive layer 28 is uniform along the length of the splicing tape 10. The adhesive layer 28 may be uniform across all or substantially all of the width of the tape 10. Alternatively, the adhesive may be applied in a gradient along the width of the tape 10. A gradient can be used to control the separation force required to separate the first and second components 12, 20 from one another. For example, it may be desirable to have a low separation force at the front of the tape 10 to allow separation to begin easily, and then to increase the separation force along the width as separation progresses from the front of the tape to the rear of the tape during the flying splice operation. To achieve this gradient, the adhesive may be applied in increasing coating weight across the width of the splicing tape from front to rear. In the illustrated embodiment, the adhesive layer 28 includes four segments 28a, 28b, 28c, and 28d from front to rear. From front to rear, each segment includes a higher coating weight. For example, segment 28a has a relatively low coating weight to allow separation to begin easily at the front of the splicing tape. Segments 28b, c, and d each have progressively higher coating weights.

The adhesive layers 16 and 24 of the splicing tape 10 of the present invention can be the same or different. The adhesive layers 16 and 24 may include any known adhesive that permanently and strongly adheres to the outer turn 32 and next-to-the-outer turn 31 of the new roll 30 and to the further sheet material the leading edge portion 34 of the outer turn 32 is to be spliced to. Examples include pressure sensitive adhesives, heat activated adhesives, thermosetting adhesives and remoistenable adhesives. Particularly preferred adhesives include pressure sensitive adhesives which may be hot-melt adhesives, essentially solvent or water-free adhesives or solvent- or water-based dispersions or solutions. Specific pressure sensitive adhesives include acrylate-based pressure sensitive adhesives, styrene-isoprene block copolymers, acrylic ester-vinyl acetate copolymers, ethylene-vinyl acetate copolymers, plasticized vinyl acetate homopolymers and rubber-latex resin emulsion systems. In the practice of preferred embodiments of the invention, the adhesive composition comprises an acrylate-based pressure sensitive adhesive. Acrylate-based pressure sensitive adhesives useful in practicing the invention comprise polymers of one or more monomers of (meth)acrylic acids and optionally other copolymerizable monomers containing functional groups in addition to an ethylenically unsaturated group. The acrylate-based pressure sensitive adhesive may comprise conventional additives such as, for example, fillers, antioxidants, flame-retardants, pigments, plasticizers or polymer additives. By varying the nature and amount of the monomers and the nature and amount of the additives, the cohesive properties of the resulting adhesive can be changed as is known in the art.

Examples of acrylate-based pressure sensitive adhesives which are suitable in the practice of the invention are described in Satas, "Acrylic Adhesives," *Handbook of Pressure-Sensitive Adhesive Technology, 2nd ed.*, pp. 396–456 (D. Satas, ed.), Van Nostrand Reinhold, New York (1989).

A particularly suitable acrylate based pressure sensitive adhesive includes copolymers of an acrylic or methacrylic acid and an alkyl acrylate or methacrylate wherein the alkyl group has at least 4 carbon atoms, typically 4 to 14 carbon atoms. Examples of such alkyl acrylates or methacrylates include n-butyl, n-pentyl, n-hexyl, cyclohexyl, isoheptyl, n-nonyl, n-decyl, isohexyl, isobornyl, 2-ethyloctyl, isooctyl, and 2-ethylhexyl acrylates and methacrylates. Preferred alkyl acrylates include isooctyl acrylate, 2-ethylhexyl acrylate, n-butylacrylate and cyclohexyl acrylate. A particularly preferred alkyl acrylate is isooctyl acrylate. Particularly preferred alkyl methacrylates include butyl methacrylate, cyclohexyl methacrylate, and isobornyl methacrylate.

In accordance with a highly preferred embodiment of this invention, the adhesive layers 16 and 24 comprise a repulpable adhesive. A preferred repulpable adhesive for use in this invention has a rating of not more than 3 in the European repulpability test described in U.S. Pat. No. 5,380,779. Examples of repulpable adhesives for use in the invention include the repulpable adhesives disclosed in the following United States patents: U.S. Pat. Nos. 5,380,779; 4,413,080; 4,569,960; 4,482,675; 4,388,432; 5,102,733; and 5,125,995. The thickness of the adhesive layers 16 or 24 can be varied widely but is typically independent of each other and is typically between 200 $\mu$m and 350 $\mu$m and preferably between 230 $\mu$m and 300 $\mu$m.

The first backing 14 and second backing 22 can be the same or different, and are preferably the same. Backings 14 and 22 may be, for example, of any material commonly used for backings of tapes and includes paper layers as well as plastic films. Suitable backings include polyethylene films, polypropylene films, polyester films, polyethylene or polypropylene coated papers, Kraft papers and non-woven materials. In case paper is used as first or second backing 14, 22, it is preferred to use smooth papers of low porosity. Paper backings are preferred because of their repulpability. One suitable backing material is a white, repulpable 31 gram/m$^2$ paper backing available from Akrosil, Europe in The Netherlands. The thickness of backings 14, 22 are independent of each other, and are typically between 40 $\mu$m and 90 $\mu$m and preferably between 50 $\mu$m and 60 $\mu$m.

The splicing tape 10 according to the present invention preferably includes a release liner 11 attached to the exposed surface of adhesive layer 16 of the first tape component 12 for storage and protection. If the splicing tape is provided in roll form, a release liner having release properties on both surfaces is preferred. The splicing tape 10 according to the present invention can also be provided, however, in the form of sheets and is then preferably protected by two release liners.

The components of the splice tape 10 are preferably chosen so that the tape 10 (with the exception of the liner 11) is repulpable. In particular, the backings, adhesive, and barrier coat materials are preferably chosen so that the splice tape 10 is repulpable. More preferably, the components are selected so that the splice tape 10 has a rating of not more than 3 in the European repulpability test described in U.S. Pat. No. 5,380,779.

The release liner 11 can be selected from a number of known and available papers or films having a release material coated onto one side of the web or on both sides in case of a splicing tape 10 in the form of a roll. The base web of the release liner 11 may be selected from kraft papers, super-calendered kraft papers, clay coated kraft papers, glassines, parchments, and other papers and films which have a suitable undercoating for release coating hold-out. The release coating may be any of the known materials used for their release properties for adhesives. Preferred types are silicones and modified silicones, the modification including both copolymerization of silicones with other nonrelease chemical agents or by adding nonsilicone materials to the silicone coating solution prior to application to the release base paper. Other release agents such as polyethylene, fluorocarbons, the Werner-type chromium complexes, and polyvinyl octadecyl carbamate may also be used. The choice of release coating is dependent on the tack, adhesion level, and chemical nature of the adhesive layer 16. The release liner 11 is chosen such that when it is removed from the splicing tape 10, no premature separation takes place between the first and second tape components 12, 20. In the preferred embodiment illustrated in FIG. 2, the release liner is a split release liner, including a first portion 11a and a second portion 11b. This allows for conveniently exposing a portion of first adhesive layer 16 along the length of the splicing tape for adhering the leading edge portion 34 of the outer turn 32 of the new roll to only that exposed portion of the first adhesive layer 16. The second portion of the release liner 11b may remain in place to prevent inadvertent adhesion of material to the other portion of the first layer of adhesive 16 prior to splicing the new roll to the depleting web. When it is close to the time for forming the splice, the second portion 11b of the release liner may be removed.

Figure 6:
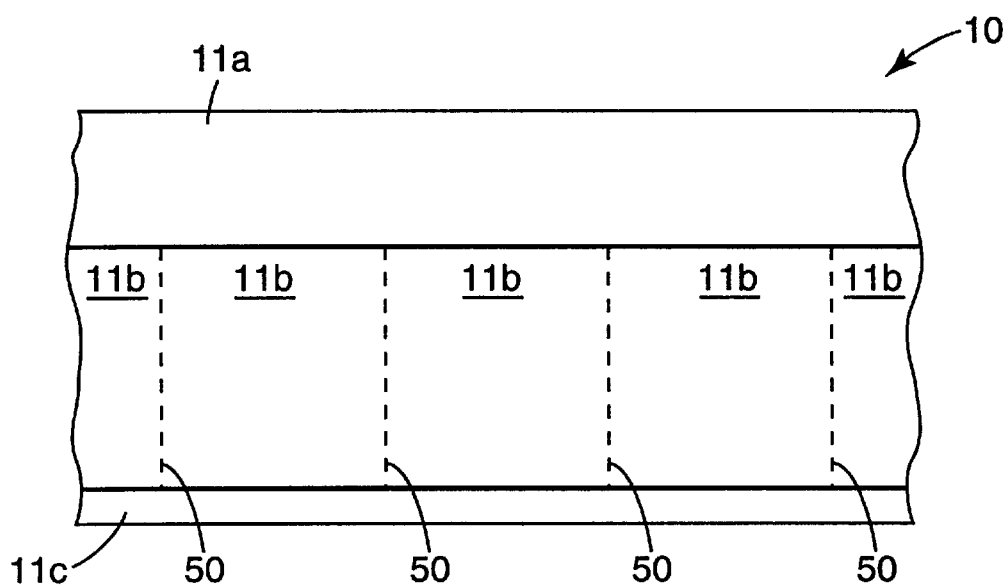
FIG. 6 is a top view of the release liner of a preferred embodiment of s splicing tape according to the present invention.

In a preferred embodiment illustrated in FIGS. 2 and 6, the liner may also include a third portion 11c that runs along the length of the splicing tape 10 at the leading edge of the tape. Preferably, the liner is split through to the adhesive 16 to separate portions 11a, 11b, and 11c. In a still more preferred embodiment, portion 11b of the liner is further separated into discreet segments along the length of the splicing tape 10. These segments are illustrated in FIG. 6 as being separated by perforated lines 50. Lines 50 may be score lines, perforations, or any other line of weakness that allows the liner portion 11b to be separated as desired. The lines 50 run from front to rear across the width of the liner, and are separated from one another at desired intervals along the length of the tape. As discussed in more detail below, the embodiment shown in FIG. 6 is preferred for leaving a portion of the liner to serve as a bridge in belt driven arrangements.

Figure 1A:
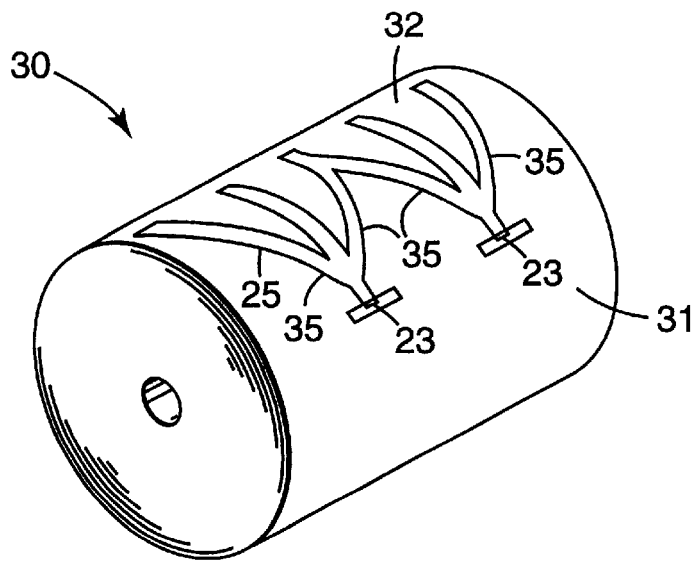
FIGS. 1a and 1b illustrate two prior art configurations for dressing a new roll of sheet material for making a flying splice.
Figure 1B:
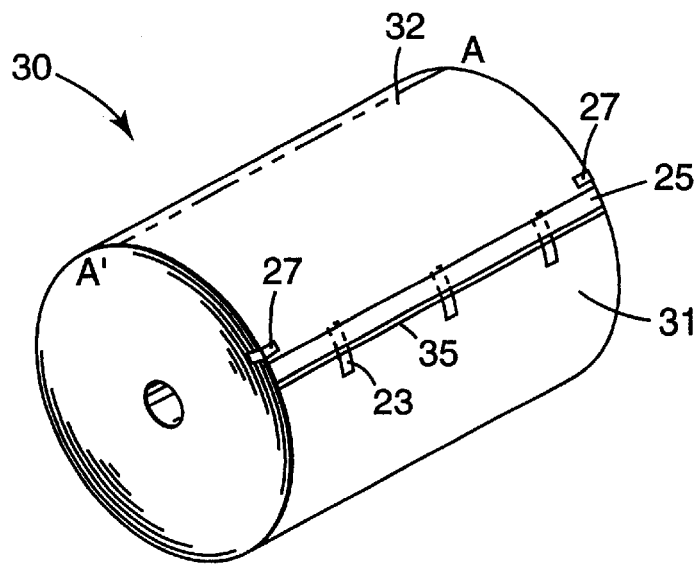
Figure 1C:
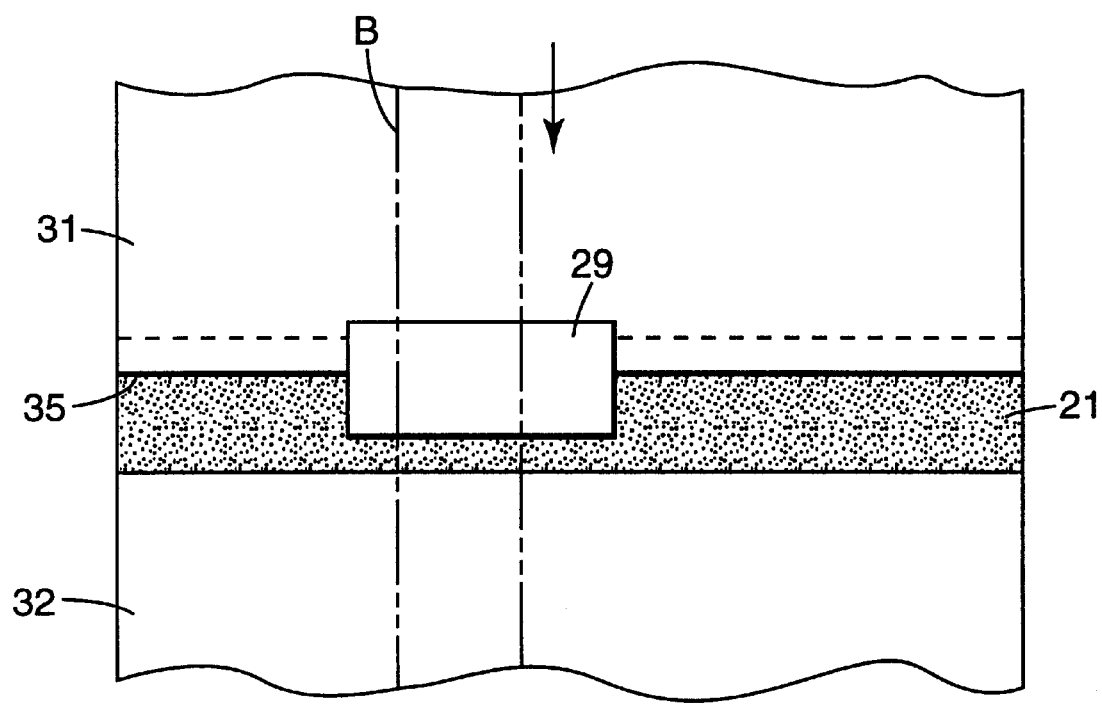
FIG. 1c illustrates a prior art bridge applied to a new roll of sheet material.
Figure 3:
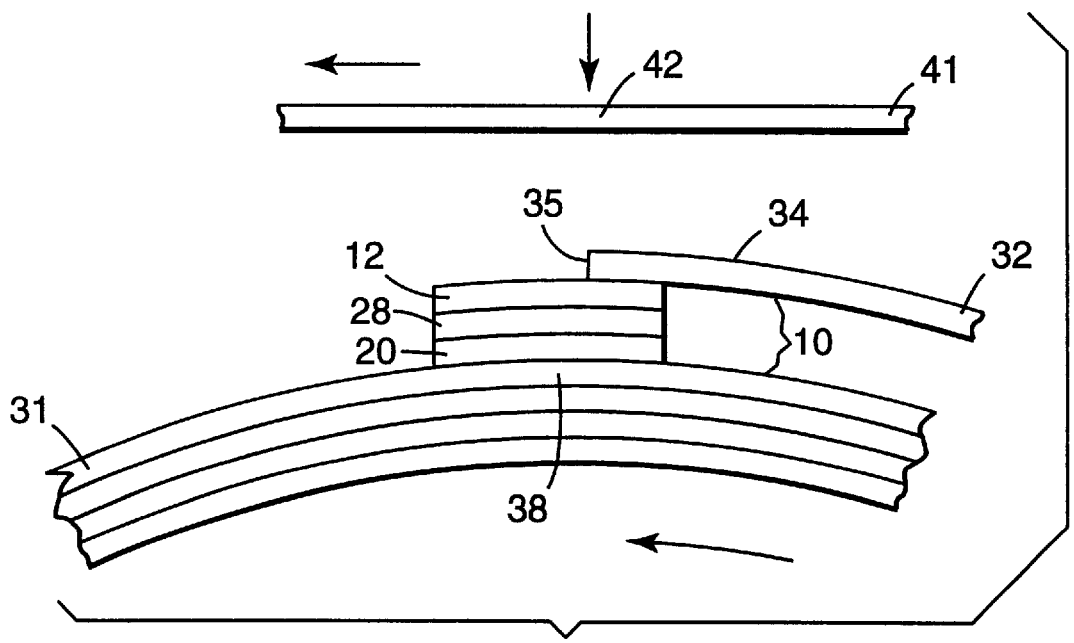
FIG. 3 is a partial side view of a new roll of sheet material with the splicing tape of FIG. 2 between the outer turn and the next to outer turn of the new roll, ready to form a splice with the other web of material.
Figure 4:
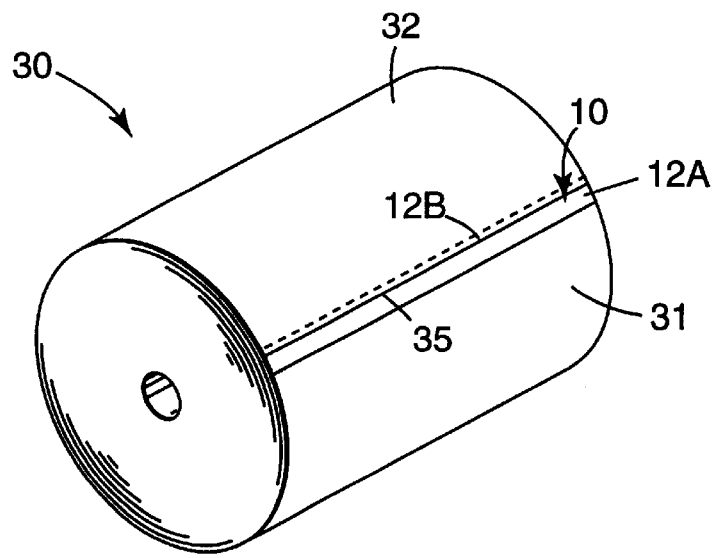
FIG. 4 is an isometric view of the new roll of sheet material dressed for the preparation of the flying splice.

FIG. 3 illustrates a method according to the present invention using the splicing tape 10 for making a flying splice between the trailing end of a depleting roll of sheet material which is being advanced, and a new roll of sheet material 30. FIG. 3 shows the leading edge portion 34 of the outer turn 32 of new roll 30, the splicing tape 10 according to FIG. 2, the next-to-outer turn 31 of new roll 30 and a few following inner turns of the new roll 30, the running web sheet 41 of the depleting roll and the portion 42 of the running web sheet 41 which is to be connected to the exposed part of first adhesive layer 16 of the first tape component 12. The second adhesive layer 24 of the second tape component 20 of the splicing tape 10 is adhered to portion 38 of the upper-surface of the next-to-the-outer turn 31 of the new roll 30 in a way so that the under surface of the leading edge portion 34 next to the leading edge 35 can be adhered to the portion of the adhesive layer 16 that had been covered by the first portion 11a of the release liner. This leaves the remaining portion of the first adhesive layer 16 exposed. The splicing tape 10 can be applied in various configurations. In a preferred embodiment the splicing tape is applied along essentially all of the leading edge 35 of the new roll 30 in order to effectively suppress lifting of the leading edge by preventing air from entering between the outer turn 32 and the next-to-outer turn 31 at the leading edge 35. A specific embodiment is shown in FIG. 4 where the leading edge 35 of the outer turn 32 of the new roll 30 is essentially parallel to the longitudinal symmetry axis of the new roll 30. The splicing tape 10 according to the invention can, however, also be applied as a nose tab, typically together with an additional double-sided adhesive tape which is attached at or close to the leading edge 35 of the outer turn 32 as is shown in FIG. 1a.

Figure 5:
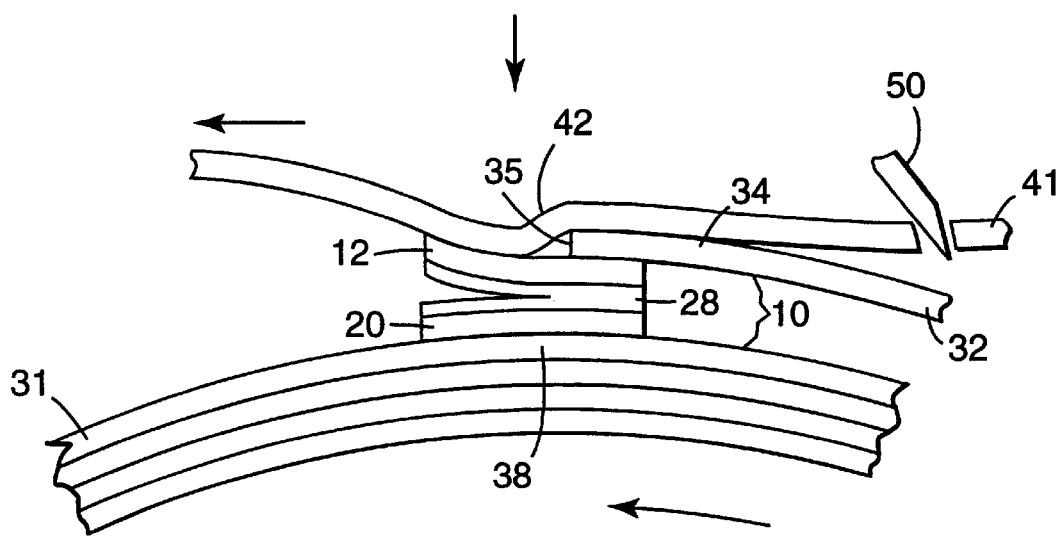
FIG. 5 is a side view showing the preparation of the flying splice between the trailing portion of the depleting roll of web material and the outer turn of the new roll of web material.

To make the splice, the new roll 30 is rotated about its longitudinal symmetry axis and brought to a peripheral speed commensurate with the linear speed of the running web sheet 41 of the depleting roll. In an appropriate moment, when the depleting roll is close to exhaustion and the leading edge 35 of the new roll 30 is in an appropriate rotational position relative to the portion 42 of the running web sheet 41 of the depleting roll, the running web 41 is moved, for example, by means of a roller towards the leading edge portion 34 of the outer turn 32 of the new roll 30 so that the under-surface of portion 42 of the running web 41 is adhered to the remaining exposed surface of the first adhesive layer 16 of the first tape component 12. When traveling out of the area of contact where the running web sheet 41 is adhered to the splicing tape 10, the running web sheet 41 exerts a peeling force on the splicing tape 10 as is shown in FIG. 5. This causes the first tape component 12 and the second tape component 20 of splicing tape 10 to separate. Separation preferably initiates at a first, forward edge of the splicing tape, and progresses across the width of the splicing tape to a second, rear edge of the splicing tape. Separation preferably occurs consistently along the length of the splicing tape, across the entire width of the roll of web material. Upon separation of the tape components 12, 20 of the splicing tape 10, the second tape component 20 remains adhered by second adhesive layer 24 to the upper surface of the next-to-the-outer turn 31, and the first tape component 12 remains adhered by first adhesive layer 16 to the splice between the leading edge portion 34 of the outer turn of the new roll 30 and the portion 42 of the running web sheet 41 of the depleting roll. The running web sheet 41 is preferably cut essentially simultaneously to or shortly after making the splice by using the cutting device 50 as is indicated in FIG. 5.

The flying splice 10 according to the present invention is suitable for making a flying splice as is described above and is schematically shown in FIGS. 3, 4, and 5. The splicing tape 10 according to the present invention can also be used to make flying overlap splices as is shown in FIGS. 7 and 8 of EP 0 941 954.

Figure 7:
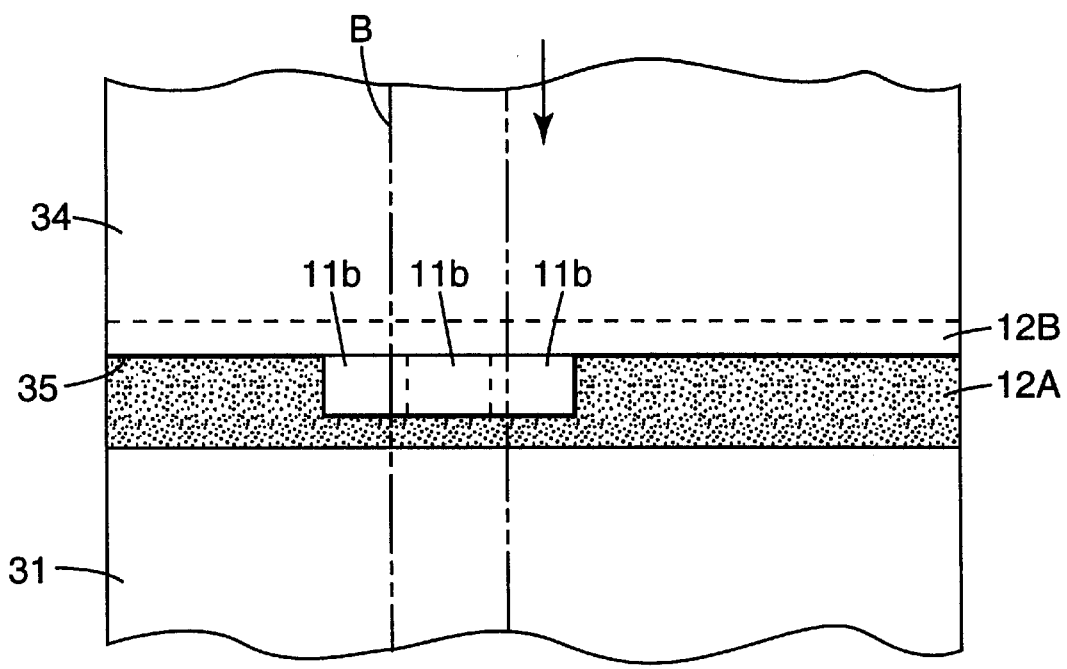
FIG. 7 is a view of a new roll of sheet material with a portion of release liner remaining on the splicing tape.

For arrangements in which the new roll is to be brought up to line speed with a belt drive, the liner arrangement of FIGS. 6 and 7 is preferred. Preparation of the splice is carried out as just described, with the following exceptions. Portion 11a of the liner is removed as discussed above to allow the leading edge portion of the outermost turn to be adhered to the adhesive 16 of the splicing tape. Portions 11b and 11c remain in place until close to the time for forming the splice. Then, portion 11c is removed along the entire length of the tape 10. Lastly, portion 11b is removed, except in the area B which is to be contacted by the belt. A desired number of segments of 11b are left in place by separating the second portion 11b along the perforated lines 50 and removing segments from opposite sides of the remaining bridge segments. In one preferred embodiment, third portion 11c is sized to leave a desired width of adhesive layer 16 exposed in front of the bridge segments of second portion 11b. This will allow the flying splice to take hold and initiate separation in the area of the bridge, while also preventing the belt from causing tearing or premature separation. For some applications, first portion 11a is preferably about 12 mm wide, second portion 11b is preferably about 22 mm wide, and third portion 11c is from 3 to 5 mm wide, more preferably 4 mm. The segments of 11b between perforations 50 may be any convenient width. In some applications, segments 11b are preferably 25 mm wide in the direction of the length of the tape, between perforations 50.

One preferred method of making the splicing tape 10 according to the present invention is as follows. First and second tape components 12, 20 may be initially provided as separate, complete articles, with or without barrier layers already present on the backing. Suitable examples of commercially available tapes that could be used as either or both first and second tape components 12, 20, include repulpable tapes available under the trade designation 9969 Tape from 3M Company. The backing side of the second tape component 20 may be coated with barrier layer 26, such as with an anilox coating roller. The amount of barrier layer applied can be controlled by selecting an anilox roller with a desired theoretical volume of the cells that coat the barrier layer. In one preferred embodiment, the barrier layer is a UV curable coating that is then cured, such as with a 3 kw mercury vapor bulb. The liner 11 on first tape component 12 can be slit to form first and second portions 11a, 11b. The liner may be also slit to form portion 11c, if desired. Further, perforations 50 may be formed in portion 11b of the liner if desired. The backing side of the first tape component 12 may be coated with preferred barrier layer 18, for those embodiments in which the first barrier layer is to be included. As with the second tape component, this can be done with an anilox coating roller with a desired theoretical volume. In the preferred embodiment in which the first barrier layer 18 comprises a UV curable coating, it may be then cured, such as with a 3 kw mercury vapor bulb. The third adhesive layer 28 may then be coated onto the backing of either tape component. In one preferred embodiment, the third adhesive layer 28 is coated onto the first barrier layer 18 of the first tape component 12, such as with an anilox coating roller with a desired theoretical volume. This may be uniformly applied across the width of the tape 10. The first and second tape components may then be laminated together such that the third adhesive layer separably bonds the components together. Preferably, one of the nip rolls is covered with foam, such as a foam tape. The density of the foam and the nip pressure can be varied as desired to help control the break out force of the splicing tape 10. If present, the liner that was provided with the second tape component 20 can then be removed. The splicing tape 10 is then wound up as a finished roll. The preparation of the first and second tape components 12, 20 for lamination into a splicing tape 10 can be carried out simultaneously or in sequence. Furthermore, it is not necessary that the tape components be provided as separate, finished articles themselves. The components may be manufactured immediately prior to final assembly of the spicing tape.

In those embodiments in which the adhesive layer 28 comprises a gradient across the width of the tape, construction of the tape may be as just described, with the following exception. A graduated printing plate may be used to apply the adhesive layer 28. In one preferred embodiment, a Nyloflex type 170 plate from BASF may be used. One preferred embodiment includes four segments 28a–d. First segment 28a may have a width of 9 mm, and the printing plate may apply adhesive to 60% of the area. Second segment may be 3 mm wide, with 70% print area. Third segment 28c may be 3 mm across, with a print area of 85%. Fourth segment 28d may be 35 mm across, with a print area of 100%. In a second preferred embodiment, the segment widths may be the same as the first, with the print areas for segments 28a–d being 80%, 90%, 95%, and 100%, respectively. By varying the amount of adhesive 28 applied across the width of the tape, it is possible to control the break out force across the width. For example, it may be preferred to have a break out force as low as 40–50 g/25 mm at the front of the tape, and a break out force as high as 115 g/25 mm at the rear of the splicing tape.

With the benefit of the teachings of the present application, a person skilled in the art can select suitable materials for the various components of the splicing tape to provide a desired break out force between the first and second tape components 12, 20. For example, the bond force "A" between the first adhesive layer 16 and the spliced portions of the web should be greater than the break out force "F" required to separate the components of the splicing tape in use. Similarly, the bond force "B" between the second adhesive layer 22 and the outer surface of next to last turn 31 of the new roll 30 should be greater than the break out force F required to separate the components of the splicing tape in use. In other words, both A and B should be greater than F.

If it is desired to separate the splicing tape by cohesive separation of the third adhesive layer 28, then the cohesive strength "C" of the third adhesive layer will define the breakout force F of the splicing tape. In this embodiment, the bond force "D" between first barrier layer 18 and third adhesive layer 28 should be greater than C. Similarly, the bond force "E" between second barrier layer 26 and third adhesive layer 28 should be greater than C. In other words, both D and E should be greater than C.

If it is desired that the splicing tape 10 delaminate between the first barrier layer 18 and the third adhesive layer 28, such that the third adhesive layer substantially remains on the second tape component 20, then the following conditions should be met. The bond force D between the first barrier layer 18 and the third adhesive layer 28 should be less than both the cohesive strength C of the third adhesive layer 28 and the bond strength E between the second barrier layer 26 and the third adhesive layer 28. In other words, D should be less than both C and E. In this embodiment, it is force D that will determine the overall break out force F of the splicing tape.

Alternatively, if it is desired that the splicing tape 10 delaminate between the second barrier layer 26 and the third adhesive layer 28, such that the third adhesive layer substantially remains on the first tape component 12, then the following conditions should be met. The bond force E between the second barrier layer 26 and the third adhesive layer 28 should be less than both the cohesive strength C and the bond strength E between the first barrier layer 18 and the third adhesive layer 28. In other words, E should be less than both C and D. In this embodiment, it is force E that will determine the overall break out force F of the splicing tape.

The barrier layers are selected with regard to the material of the backings 14, 22, and with regard to the third adhesive layer 28 to provide the desired break out force. The barrier layer should be chosen so as to prevent the adhesive layer 28 from penetrating significantly into the backings, particularly when the backings comprise repulpable backings such as paper or other cellulosic backings. The barrier layer also preferably provides a smooth, continuous surface onto which the third adhesive layer can be applied. If the adhesive 28 penetrates significantly into the backings, this could provide such as strong bond between the first and second tape backings that the resulting break out force of the splicing tape is undesirably high. The barrier layers are preferably selected such that the splicing tape is repulpable, especially when the splicing tape is to be used in paper splicing applications in which repulpability is desired or required. In one preferred embodiment, the barrier layers comprise a lacquer, such as a UV curable lacquer. Suitable materials for barrier layers 18, 26, include L001 UV lacquer; V073 UV lacquer; L044 UV lacquer, and T7201 UV tint medium; all available from Paragon Inks, East Mains Industrial Estate, Broxburn, West Lothian, Scotland, EH52 5NB. Either or both barrier layers 18, 26 may be a filled layer so as to include a release material such as silicone or fluorine containing material. Particularly suitable materials are silicone-containing materials. By varying the amount of silicone in either or both barrier layers 18, 26, the force required for delaminating the splicing tape 10 between either or both barrier layers and the third adhesive layer 28 can be adjusted as desired. Also, varying the coating weight of either or both of the barrier layers may be done to achieve the desired break out force, such as by using anilox coating rollers of varying theoretical volume.

In some applications, it is desirable to decrease the break out force when measured across the width of the splicing tape to make it easier to initiate and complete separation of the first and second components 12, 20 during the flying splice operation. However, it may be desirable to lower the cross direction break out force while maintaining the lengthwise break out force. Maintaining a high break out force in the direction along the length of the splicing tape allows the tape to be conveniently wound in roll form without prematurely separating the first and second portions 12, 20. In one preferred embodiment, the first barrier layer 18 or second barrier layer 26 may be omitted, more preferably the first barrier layer is omitted. It has been observed that for certain constructions, removing the first barrier layer can significantly reduce the cross direction separation force, from about 100–120 g/25 mm down to about 33–40 g/25 mm; while maintaining the lengthwise break out force substantially unaffected, at about 33–35 g/25 mm.

As with the barrier layers, the third adhesive 28 is selected to provide the desired break out force, with regard to the materials used for the backings and the barrier layers. Preferably, the third adhesive layer is repulpable. Suitable adhesives may be selected from those described above as being preferable for use as the first and second adhesive layers 16, 24, of the first and second tape components 12, 20. Preferred adhesives include the synthetic resin emulsion adhesive commercially available as Lunabond 1533X adhesive from H. B. Fuller, Dukinfield, Cheshire, UK. Other suitable adhesives include the PVA adhesives available commercially as SUPER-LOK250; PELLETIE-FIX321; BIND-FLEX20; and 072-0243; all available from Direct Adhesives, Buckinghamshire.

The type and/or coating weight of the third adhesive layer 28 can also be varied to control the break out force between the first and second tape components 12, 20 of the splicing tape 10. For many applications, increasing the coating weight of the third adhesive layer will increase the break out force. In one preferred embodiment, the third adhesive layer is applied with an anilox coating roll. The theoretical coating volume of the anilox coating roll is determined from the size of the cells which apply the adhesive. By increasing the theoretical volume, the coating weight of third adhesive 28 is increased.

Controlling the nip pressure when the first and second tape components are laminated together can also be done to control the break out force. In many applications, increasing the nip pressure will increase the bond between the first and second tape components 12, 20, thereby increasing the break out force.

In a preferred embodiment, the barrier layers and the third adhesive layer are selected such the splice tape 10, after making the splice and separating into the first component and second component, present surfaces that are printable and/or coatable, as desired for the particular application of the splice tape.

EXAMPLES

The operation of the present invention will be further described with regard to the following detailed examples. These examples are offered to further illustrate the various specific and preferred embodiments and techniques. It should be understood, however, that many variations and modifications may be made while remaining within the scope of the present invention.

Examples 1–4 were prepared generally as follows. The splicing tape 10 was constructed of two repulpable pressure sensitive adhesive tape components 12, 20. First tape component 12 included a paper backing 14, a first adhesive 16 suitable for the flying splice application, and a two sided silicone release liner 11. Second tape component 20 included a paper backing 22, a second adhesive 24 suitable for the tabbing application, and a single side silicone release liner. The backings 14, 22 were each coated with a UV curable lacquer as barrier layers 18, 26. A dry bond adhesive 28 was coated over the lacquer coating on one of the tape components. The tape components 12, 20 were then laminated together to form splicing tape 10. One of the nip rollers had a foam tape applied thereto. The liner 11 was slit to provide first and second portions 11a, 11b. The liner of second tape component 20 was removed and discarded.

The foams used to control the lamination pressure at the nip were characterized by measuring the compressive Young's modulus. Modulus values for the single-sided foam tapes employed in the lamination were obtained using a Rheometrics Solids Analyzer II, manufactured by Rheometrics Scientific, Parsippany, N.J. The equipment was controlled by Rheometrics Orchestrator software, and the tests were run in the "Dynamic Frequency Sweep" mode. The software calculated the values of the compressive Young's modulus from compressive measurements at a series of discrete frequencies. Samples consisted of 16 mm diameter punched disks of foam tape which were laminated to form a stack at least 8 mm high. A constant pre-load of 100 g was applied to each sample during data collection. The modulus values obtained at 1 Hz are taken as representative of the relative stiffness of the foam tape samples.

Samples of each of the Examples were tested as follows with a 180° peel test to measure the breakout force of the splicing tape 10. Adhesion test equipment with a speed of 7 in/min (17.8 cm/min) and a 5 pound load cell (2.27 kg) was used for the peel test. For each example, a sample of the splicing tape 1 in (2.54 cm) wide by approximately 12 in (30.5 cm) long was used. A double sided adhesive tape at least as large as the sample to be tested was adhered onto a glass surface. The splicing tape sample was then adhered by the adhesive layer 16 of the first tape component 12 onto the double sided adhesive tape. The second tape component was then attached to the load cell of the test apparatus. The carriage of the test apparatus was then set in motion for the 180° peel test. The average force measured by the load cell was recorded and is reported below as the break out force.

Example 1 was prepared by:

1) coating the backing side of second tape component 20 with barrier layer 26, which was L001 Lacquer, produced by Paragon Inks, East Mains Industrial Estate, Broxbum, West Lothian, Scotland, EH52 5NB, using an anilox coating roller with a theoretical volume of 11.5 cm$^3$/m$^2$, 2) curing the barrier layer with a 3 kw mercury vapor bulb;

3) score slitting the liner 11 on first tape component 12 to form first and second portions 11a, 11b. The score slitting of the liner was performed as follows. For a 38 mm wide roll of splicing tape 10, the liner is split into 12 mm and 26 mm widths; for a 31 mm wide roll of splicing tape 10, the liner is split into 12 mm and 19 mm widths.

4) coating the backing side of the first tape component 12 with barrier layer 18, which was L001 Lacquer from Paragon Inks, East Mains Industrial Estate, Broxburn, West Lothian, Scotland, EH52 5NB, using an anilox coating roller with a theoretical volume of 11.5 cm$^3$/m$^2$, 5) curing the barrier layer 18 with a 3 kw mercury vapor bulb;

6) coating the barrier layer 18 of the first tape component 12 with the third adhesive layer 28, which was Lunabond 1533X adhesive from H. B. Fuller, Dukinfield, Cheshire, UK, using an anilox coating roller with a theoretical volume of 12.71 cm$^3$/m$^2$;

7) laminating first and second tape components together such that third adhesive 28 on the first tape component is adhered to the second barrier layer 26 of the second tape component, with one of the nip rolls covered with a 0.24 gram/cm$^3$ density foam;

8) removing the liner from the second tape component 20; and 9) winding up the finished roll of splicing tape 10.

Examples made in accordance with Example 1 were observed to perform very well in flying splice tests. A sample of Example 1 was tested for peel force as described above, with the results provided in the Table below.

Examples 2–4 were prepared in the same method as Example 1 except as follows. Anilox coating rolls of different cell volumes were used to apply different coating weights of the third adhesive layer 18, and foams of different stiffness were applied to one roll of the nip when laminating the first and second tape components together, as reported in the table below. Samples from Examples 2–4 were tested for break out force as described above, with the results presented in the table.

| Example | Anilox roll cell volume (cm$^3$/m$^2$) | Foam density (g/cm$^3$) | Young's Modulus of Foam (Pa @ 1 Hz) | Break out force (g/25 mm) |
| --- | --- | --- | --- | --- |
| 1 | 12.71 | 0.24 | 1.98 × 10$^5$ | 18 |
| 2 | 7.05 | 0.35 | 5.02 × 10$^5$ | 29 |
| 3 | 11.5 | 0.35 | 5.02 × 10$^5$ | 40 |
| 4 | 12.71 | 0.35 | 5.02 × 10$^5$ | 50 |

The breakout force of the splicing tape 10 was observed to be dependent on the coating weight of the third adhesive layer 28 (as determined by the anilox roll cell volume) and by the nip pressure as the first and second components 12, 20 are laminated together. The nip pressure was varied by selecting the density of the foam wrap on the nip roll of the laminator. It was observed that increasing the coating weight of third adhesive layer 28 by increasing the anilox roll cell volume increases the measured breakout force. It was also observed that increasing the nip pressure by increasing the foam density or foam modulus increases the measured breakout force.

The tests and test results described above are intended solely to be illustrative, rather than predictive, and variations in the testing procedure can be expected to yield different results.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A splicing tape for splicing a leading edge portion of the outer turn of a roll of sheet material to a second sheet material, said splicing tape comprising:

a first tape component including a first backing, a first layer of adhesive on a first surface of said first backing, and a first barrier layer on a second surface of said first backing;

a second tape component including a second backing, a second layer of adhesive on a first surface of said second backing, and a second barrier layer on a second surface of said second backing; and a third layer of adhesive separably joining said first barrier layer and said second barrier together.

2. The splicing tape of claim 1, wherein said first and second backings comprise repulpable backings.

3. The splicing tape of claim 2, wherein said first and second backings comprise cellulosic backings.

4. The splicing tape of claim 3, wherein said first and second backings comprise paper backings.

5. The splicing tape of claim 1, wherein said first and second barrier layers prevent significant penetration of said third adhesive layer into said first and second backings.

6. The splicing tape of claim 5, wherein at least one of said barrier layers comprises a lacquer.

7. The splicing tape of claim 1, wherein at least one of said barrier layers comprises a filled barrier layer to control the bond strength between said filled barrier layer and said third adhesive layer.

8. The splicing tape of claim 7, wherein said filled barrier layer comprises a silicone filled barrier layer.

9. The splicing tape of claim 1, wherein said barrier layer comprises a UV curable barrier layer.

10. The splicing tape of claim 1, wherein said third layer of adhesive comprises a water-based adhesive.

11. The splicing tape of claim 1, wherein said third layer of adhesive comprises a synthetic resin emulsion based adhesive.

12. The splicing tape of claim 1, wherein said third layer of adhesive comprises a gradient in the direction along the width of the tape.

13. The splicing tape of claim 1, wherein in use, said splicing tape separates by cohesive separation of said third adhesive layer.

14. The splicing tape of claim 1, wherein in use, said splicing tape separates by delamination between said third adhesive layer and either of said first and second barrier layers.

15. The splicing tape of claim 14, wherein said release liner comprises a first portion and a second portion, each being independently separable from said splicing tape.

16. The splicing tape of claim 14, wherein said release liner comprises a first portion, and a second portion, and a third portion, wherein said first portion extends along the length of said splicing tape adjacent a first edge of said splicing tape, said third portion extends along the length of said splicing tape adjacent a second edge of said splicing tape, and said second portion extends along the length of said splicing tape between said first and third portions; and wherein said second portion of said release liner includes a plurality of weakened lines extending across the width of said second portion.

17. The splicing tape of claim 1, further comprising a release liner on at least one of said first and second adhesive layers.

18. The splicing tape of claim 1, further comprising a release liner on at least one of said first and second adhesive layers.

19. The splicing tape of claim 18, wherein said release liner comprises a first portion and a second portion, each being independently separable from said splicing tape.

20. The splicing tape of claim 18, wherein said release liner comprises a first portion, a second portion, and a third portion, wherein said first portion extends along the length of said splicing tape adjacent a first edge of said splicing tape, said third portion extends along the length of said splicing tape adjacent a second edge of said splicing tape, and said third second portion extends along the length of said splicing tape between said first and second portions; and wherein said second portion of said splicing tape includes a plurality of weakened lines extending across the width of said second portion.

21. A splicing tape for splicing a leading edge portion of the outer turn of a roll of sheet material to a second sheet material, said splicing tape comprising:
 a first tape component including a first backing and a first layer of adhesive on a first surface of said first backing,
 a second tape component including a second backing and a second layer of adhesive on a first surface of said second backing,
 a third layer of adhesive separably joining said first backing and said second backing together, such that said first and second adhesive layers are facing away from said third adhesive layer, and
 a barrier layer between said third adhesive layer and at least one of said first and second backings.

22. The splicing tape of claim 21, wherein said first and second backings comprise repulpable backings.

23. The splicing tape of claim 22, wherein said first and second backings comprise cellulosic backings.

24. The splicing tape of claim 23, wherein said first and second backings comprise paper backings.

25. The splicing tape of claim 21, wherein said barrier layer prevents significant penetration of said third adhesive layer into at least one of said first and second backings.

26. The splicing tape of claim 25, wherein said barrier layer comprises a lacquer.

27. The splicing tape of claim 21, wherein said barrier layer comprises a filled barrier layer to control the bond strength between said filled barrier layer and said third adhesive layer.

28. The splicing tape of claim 27, wherein said filled barrier layer comprises a silicone filled barrier layer.

29. The splicing tape of claim 21, wherein said barrier layer comprises a UV curable barrier layer.

30. The splicing tape of claim 21, wherein said third layer of adhesive comprises a water-based adhesive.

31. The splicing tape of claim 21, wherein said third layer of adhesive comprises a synthetic resin emulsion based adhesive.

32. The splicing tape of claim 21, wherein said third layer of adhesive comprises a gradient in the direction along the width of the tape.

33. The splicing tape of claim 21, wherein in use, said splicing tape separates by cohesive separation of said third adhesive layer.

34. The splicing tape of claim 21, wherein in use, said splicing tape separates by delamination between said third adhesive layer and said barrier layer.

35. A method of making a splicing tape for splicing a leading edge portion of the outer turn of a roll of sheet material to a second sheet material, said method comprising the steps of:
 a) providing a first tape portion including a first backing and a first layer of adhesive;
 b) applying a first barrier layer on said first backing opposite said first layer of adhesive;
 c) providing a second tape portion including a second backing and a second layer of adhesive;
 d) applying a second barrier layer on said second backing opposite said first layer of adhesive;
 e) applying a third adhesive layer to either of said first and second barrier layers; and
 f) laminating said first and second tape portions together with said third layer of adhesive between said first and second barrier layers.

36. The method of claim 35, wherein steps b) and d) each further comprise curing said barrier layer with UV light.

37. The method of claim 35, wherein steps b) and d) are performed concurrently.

38. A method of preparing a roll of web material for a flying splice, comprising the steps of:
 a) adhering a separable splicing tape to a roll of web material, wherein the splicing tape includes a release liner facing away from the roll and a layer of adhesive covered by the release liner;
 b) removing a first portion of the release liner along the length of the splicing tape to expose a first portion of the layer of adhesive, while maintaining a second portion of the adhesive tape along the length of the splicing tape covered with a second portion of the release liner;
 c) adhering the leading edge portion of the roll of web material to the first portion of the adhesive;
 d) removing a first lengthwise segment of the second portion of the release liner while maintaining a second lengthwise segment, to thereby expose a first lengthwise segment of the second portion of the adhesive layer and to thereby maintain covered a second lengthwise segment of the second portion of the adhesive layer.

39. The method of claim 38, further comprising the step of removing a third portion of the release liner along the length of the splicing tape, wherein the second portion is between the first and third portions.

40. The method of claim 38, wherein step d) includes separating the second portion of the release liner along a weakened line.

41. The method of claim 38, wherein step d) includes removing a first and second segment of the second portion of the release liner from opposite sides of the second segment.

\* \* \* \* \*